United States Patent [19]
Trudeau et al.

[11] Patent Number: 5,860,450
[45] Date of Patent: Jan. 19, 1999

[54] HEIGHT CONTROL VALVE FOR VEHICLE LEVELING SYSTEM

[75] Inventors: Curtis A. Trudeau, Caledonia; Gary L. Schafer, Shelbyville, both of Mich.

[73] Assignee: Hadley Products Corporation, Grandville, Mich.

[21] Appl. No.: 896,070

[22] Filed: Jul. 17, 1997

[51] Int. Cl.⁶ .................................................. F15B 13/04
[52] U.S. Cl. ...................................... 137/627.5; 280/714
[58] Field of Search ......................... 137/627.5; 280/714

[56] References Cited

U.S. PATENT DOCUMENTS

| | | | |
|---|---|---|---|
| 2,854,289 | 9/1958 | Schnell | 137/627.5 X |
| 2,997,314 | 8/1961 | Hill et al. | 137/627.5 X |
| 3,006,657 | 10/1961 | Augustin | 137/627.5 X |
| 3,073,619 | 1/1963 | Manning | 137/627.5 X |
| 3,401,948 | 9/1968 | Schultz . | |
| 3,618,972 | 11/1971 | Buhl . | |
| 3,635,460 | 1/1972 | Shilton et al. . | |
| 3,836,161 | 9/1974 | Buhl . | |
| 3,955,590 | 5/1976 | Palm et al. . | |
| 4,886,092 | 12/1989 | Barzelay | 137/627.5 |
| 5,161,579 | 11/1992 | Anderson | 137/627.5 |
| 5,560,591 | 10/1996 | Trudeau et al. | 137/627.5 X |
| 5,682,922 | 11/1997 | Galazin | 137/627.5 |
| 5,699,834 | 12/1997 | Hayashi et al. | 137/884 |

*Primary Examiner*—Gerald A. Michalsky
*Attorney, Agent, or Firm*—Warner Norcross & Judd LLP

[57] ABSTRACT

A height control valve for a suspension leveling system having a valve assembly cartridge that is assembled prior to insertion into the valve body. The cartridge is threadedly received within the valve body to permit accurate setting of the valve center. In a second aspect, the height control valve includes a locking key which interlocks the drive bearing and valve body to discourage unauthorized tampering with the internal components of the valve. The locking key is resiliently secured beneath a seal that is inaccessible once the valve is assembled. In a third aspect, the height control valve includes a cap diaphragm extending between the cartridge plunger and the valve body to seal the cartridge bore and ensure that exhaust air is vented out of the valve.

37 Claims, 8 Drawing Sheets

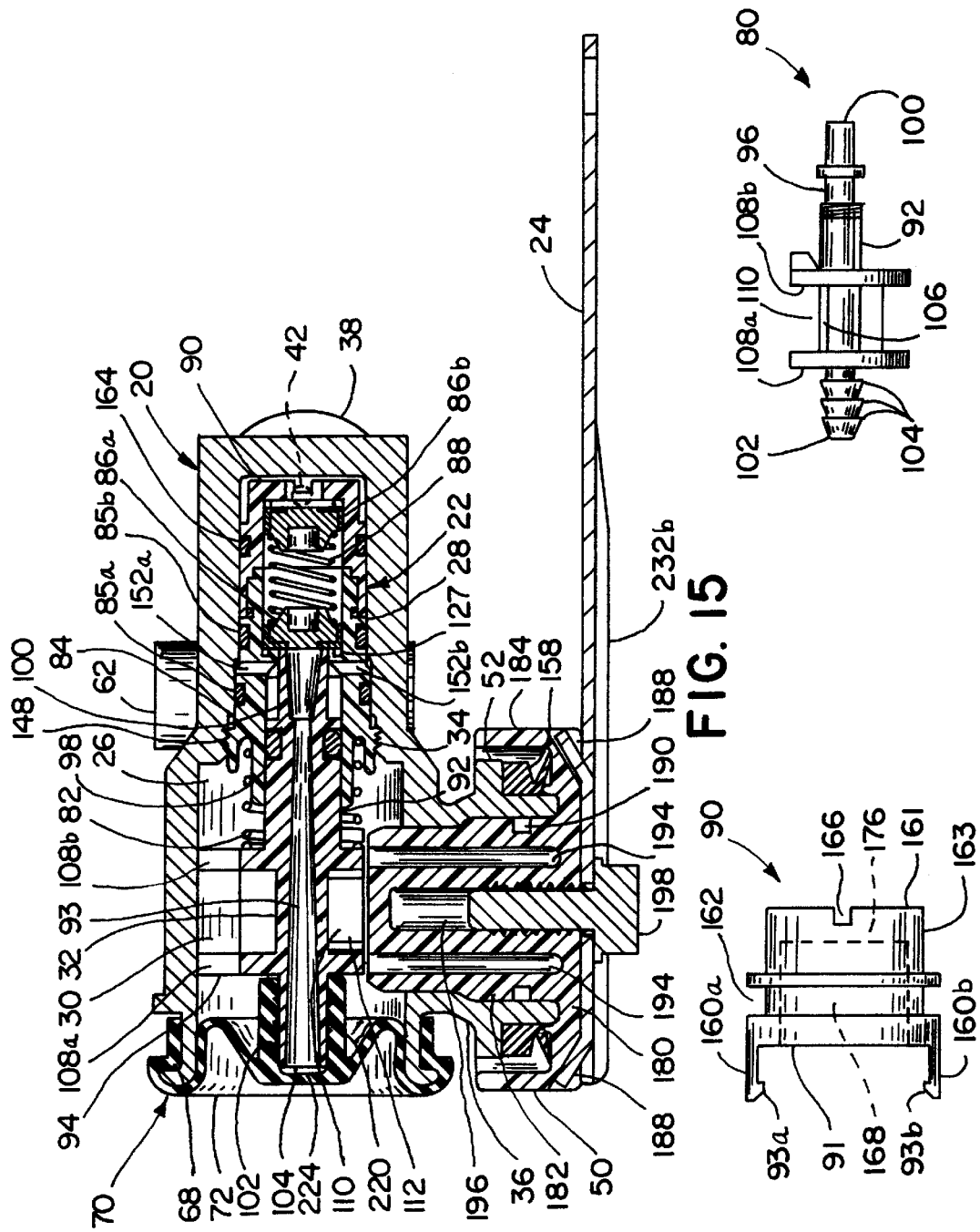

HEIGHT CONTROL VALVE FOR VEHICLE LEVELING SYSTEM

BACKGROUND OF THE INVENTION

The present invention relates to a leveling system for a vehicle, and more particularly to a height control valve for use with such a leveling system.

It is common practice to provide automotive vehicles with leveling systems that automatically adjust the suspension of the vehicle to compensate for various load conditions. These systems are installed in a wide variety of vehicles ranging from passenger cars to semi-trucks and semi-trailers. A conventional leveling system includes pneumatic suspension elements, such as shocks or air springs, that can be inflated or deflated to control the height of the frame with respect to the axle. For example, with semi-trailers, heavy loads can cause the suspension to sag, thereby decreasing the distance between the frame and the axle. Further, if the load is not evenly distributed throughout the trailer, the load may also alter the attitude of the trailer (e.g. fore-aft tilt and/or side-to-side tilt). These conditions can adversely affect the handling of the trailer, and can even result in damage to the suspension, frame, and/or axle. With conventional leveling systems, this problem is addressed by inflating the pneumatic suspension to compensate for the load. Specifically, when the attitude of the trailer has been affected by an uneven load, the various suspension elements can be inflated or deflated independently to return the trailer to the desired attitude.

In many leveling systems, the height of the suspension is automatically controlled by mechanical height control valves. Height control valves are typically located within the leveling circuit between the source of compressed air and the suspension elements. When the distance between the axle and frame falls below the desired position, the height control automatically causes inflation of the suspension, and when the distance between the axle and the frame is too great, the height control valve automatically causes the suspension to bleed or deflate. Many conventional systems include a separate height control valve at each axle. This permits separate control of the suspension at each axle which in turn permits the suspension to compensate for fore-aft tilt. Other systems include separate suspension elements and separate height control valves at each end of each axle. These more complicated systems permit compensation for side-to-side tilt as well as fore-aft tilt.

A conventional height control valve typically includes a valve body and a control arm. The valve body is generally mounted directly to the vehicle frame and contains a valve assembly which controls the flow of air through the valve. The control arm extends from the valve body to the axle, and is operatively connected to the valve assembly by an actuator mechanism. In a conventional system, the control arm is capable of moving the valve between three distinct positions. First, when in the upward (or "supply") position, the control arm manipulates the valve assembly to permit air to inflate the suspension. Second, when in the downward (or "exhaust") position, the control arm manipulates the valve assembly to permit air to bleed from the suspension. And finally, when in the central (or "closed") position, the control arm manipulates the valve assembly to prevent air from entering or exiting the suspension.

Conventional height control valves suffer from a variety of distinct problems. First, the components of the valve assembly are assembled directly within the valve body. As a result, assembly and quality control inspection of the valve assembly are relatively difficult to perform. Second, the valve assembly is readily accessible making it easy for unauthorized and potentially dangerous modifications to be made to the valve. And third, exhaust air from the suspension can drive dirt and other debris into the valve assembly and actuator mechanism where it can reduce the overall life of the valve and adversely affect its operation.

SUMMARY OF THE INVENTION

The aforementioned problems are overcome by the present invention wherein a height control valve is provided with a valve assembly cartridge that is assembled outside of the valve prior to insertion within the valve body. In the preferred embodiment, the valve assembly cartridge is threaded into the valve body to permit easy adjustment of the position of the cartridge within the body.

In a second aspect, the present invention includes a tamper resistant locking key that interlocks the drive bearing with the valve body, thereby making it difficult to gain access to the valve assembly cartridge. A resilient seal is installed over the key to resiliently secure it in place and to permit the drive bearing to snap-fit into place within the valve body during assembly. In the preferred embodiment, the valve body and drive bearing enshroud the seal to prevent its removal.

In a third aspect, the present invention includes a cap diaphragm that provides a sealed chamber and prevents air from being expelled into the actuator mechanism. The diaphragm is fitted over the valve assembly plunger and includes a skirt that extends outwardly to the valve body. The diaphragm is resilient to flex with the movement of the plunger. In the preferred embodiment, the plunger is barbed to securely receive the diaphragm.

The present invention provides a simple and effective height control valve having a valve assembly cartridge that is assembled prior to insertion within the valve body. The cartridge is relatively easy to assemble and can be visually inspected before insertion. Further, the locking key makes it difficult for unauthorized, and potentially dangerous, modifications to be made to the internal components of the valve. The resilient seal facilitates assembly by permitting the drive bearing to be snap fit into place within the valve body. Additionally, the cap diaphragm provides a sealed chamber which prevents dirt and other foreign matter from being blown into the actuator mechanism during operation.

These and other objects, advantages, and features of the invention will be readily understood and appreciated by reference to the detailed description of the preferred embodiment and the drawings.

BRIEF DESCRIPTION OF THE DRAWINGS

FIG. 7 is a side elevational view of the cartridge cap;

FIG. 8 is a side elevational view of the cartridge plunger;

FIG. 15 is a sectional view of the height control valve in the closed position taken along line XV—XV of FIG. 1;

DETAILED DESCRIPTION OF THE PREFERRED EMBODIMENT

Figure 4:
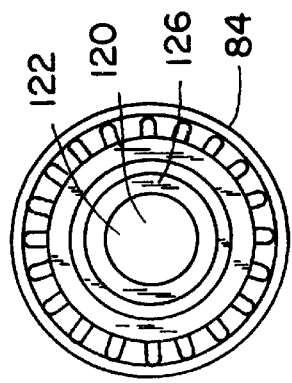
FIG. 4 is a front elevational view of the cartridge body.
Figure 6:
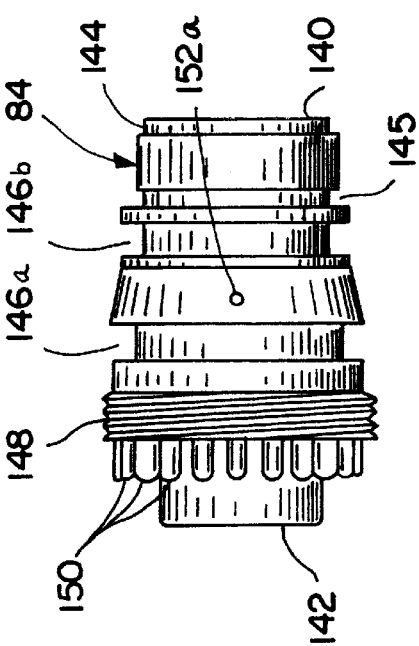
FIG. 6 is a side elevational view of the cartridge body.
Figure 1:
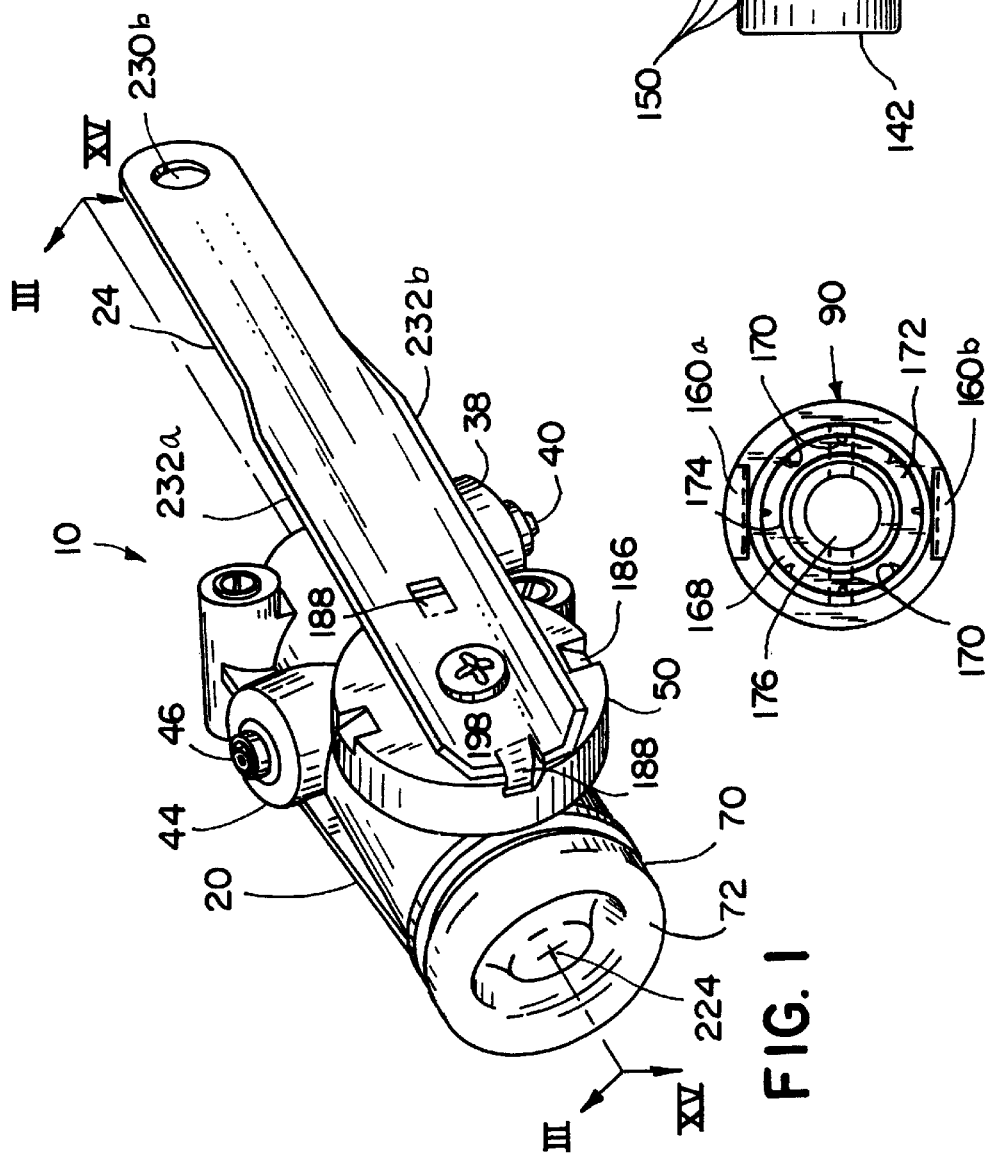
FIG. 1 is a perspective view of the height control valve.
Figure 2:
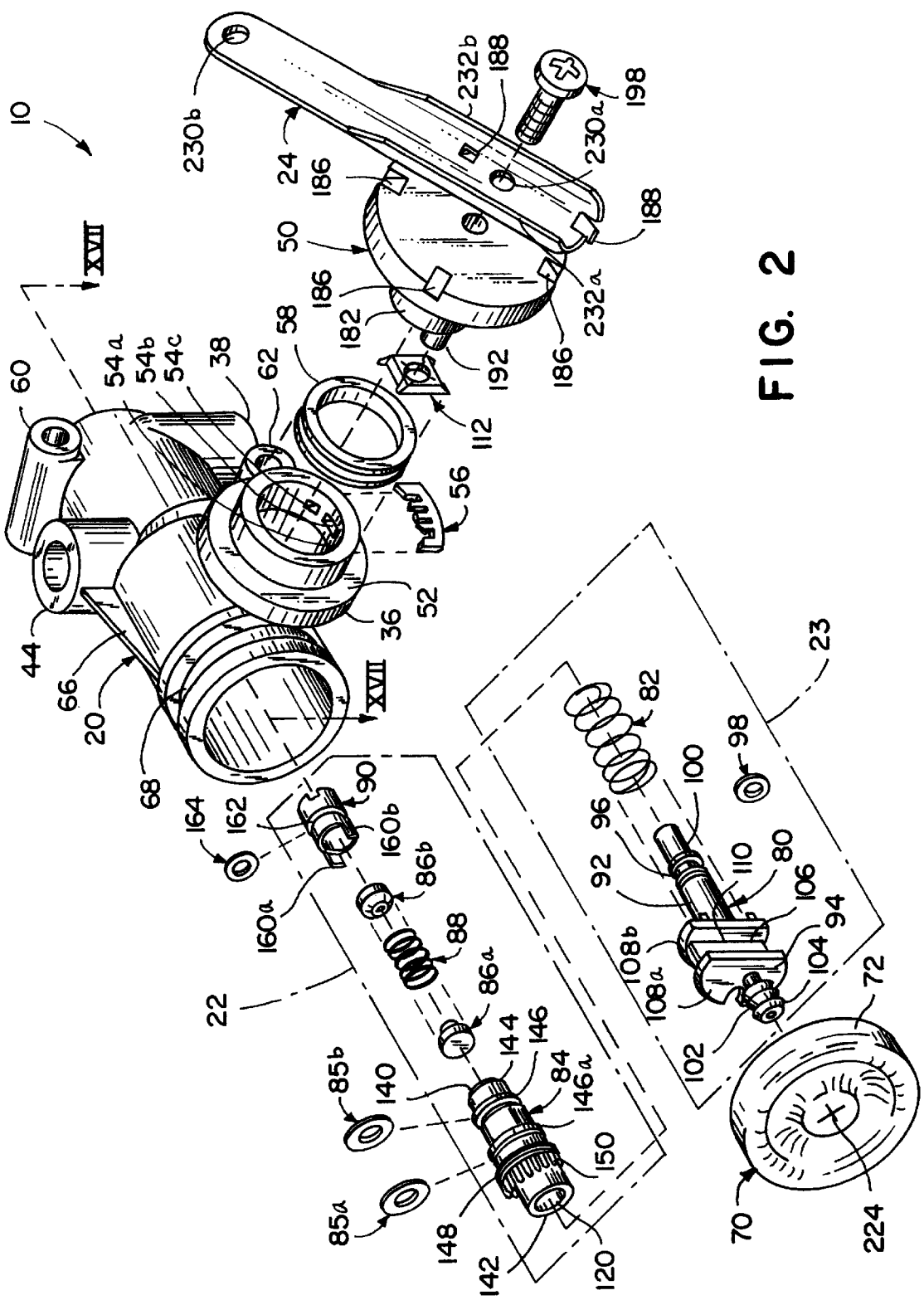
FIG. 2 is an exploded perspective view of the height control valve.
Figure 11:
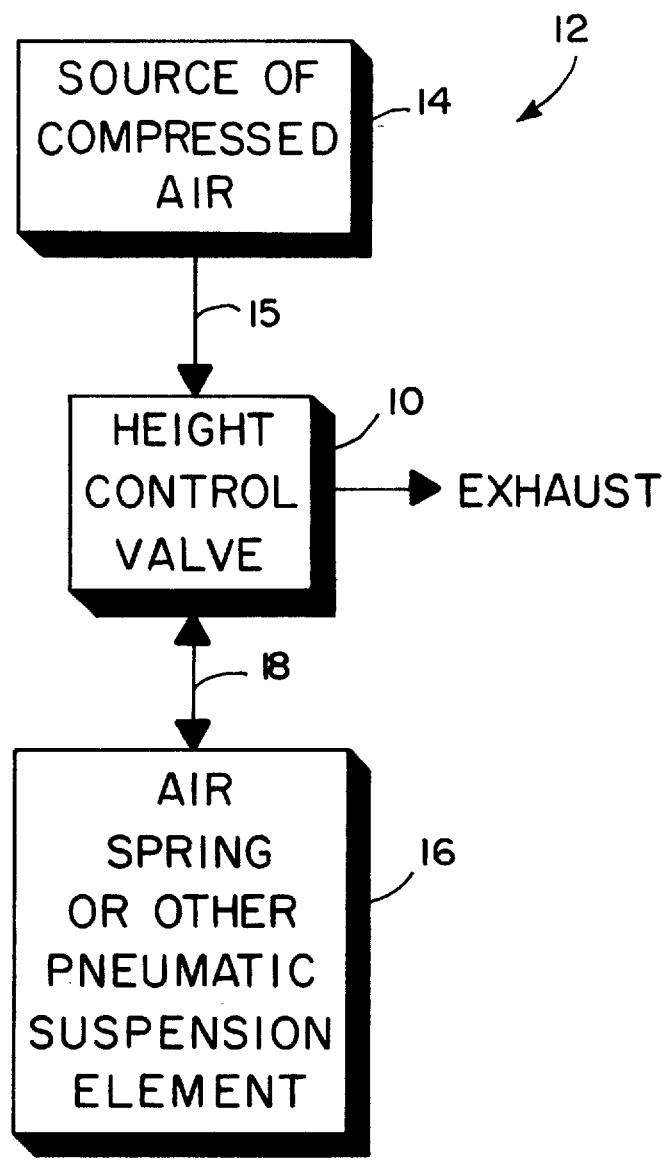
FIG. 11 is a schematic diagram of the leveling system.

A height control assembly according to a preferred embodiment of the present invention is illustrated in FIGS. 1 and 2, and generally designated 10. For purposes of disclosure, the height control valve 10 is described in connection with a conventional leveling system 12 where the valve 10 functions to control the flow of air into and out of the suspension elements, such as air spring 16 (See FIG. 11). The height control valve is well suited for use in a variety of other leveling systems, such as a conventional truck cab leveling system designed to the level the truck cab with respect the truck frame.

The height control valve 10 generally includes a valve body 20, a valve assembly cartridge 22 positioned within the body 20, a plunger assembly 23, and a control arm 24 pivotally connected to the valve body 20 and operatively connected to the cartridge 22 via the plunger assembly 23. The height control valve 10 is mounted to a vehicle (not shown) in a conventional manner with the valve body 20 secured to the frame and the free end of the control arm 24 secured to the axle. Obviously, the valve body 20 can alternatively be mounted to virtually any element that moves with the frame and the control arm 24 can alternatively be mounted to virtually any element that moves with the axle. Also, the height control valve can be installed in reverse with the valve body secured to the axle (or other related element) and the control arm secured to the frame (or other related element). In other applications, such as a truck cab leveling system, the height control valve is mounted between the two components for which relative movement is to be controlled.

Relative movement of the axle and the frame causes pivoting movement of the control arm 24 with respect to the valve body 20 which, in turn, manipulates the cartridge 22 to control the flow of air through the valve 10. As illustrated schematically in FIG. 11, the system 12 includes a conventional supply of compressed air 14, a supply line 15 interconnecting the supply of compressed air with the height control valve 10, and a supply line 18 interconnecting the height control valve 10 and the air spring 16. When the arm 24 is in the "supply" position, the height control valve 10 interconnects supply lines 15 and 18 so that air from the source 14 is supplied to the air spring 16. When the arm 24 is in the "exhaust" position, the height control valve 10 opens supply line 18 to the atmosphere thereby permitting air to exhaust from the air spring 16. And finally, when the arm 24 is in the central or closed position, the height control valve 10 closes both supply lines 15 and 18 thereby preventing air from entering or exiting the air spring 16.

Figure 3:
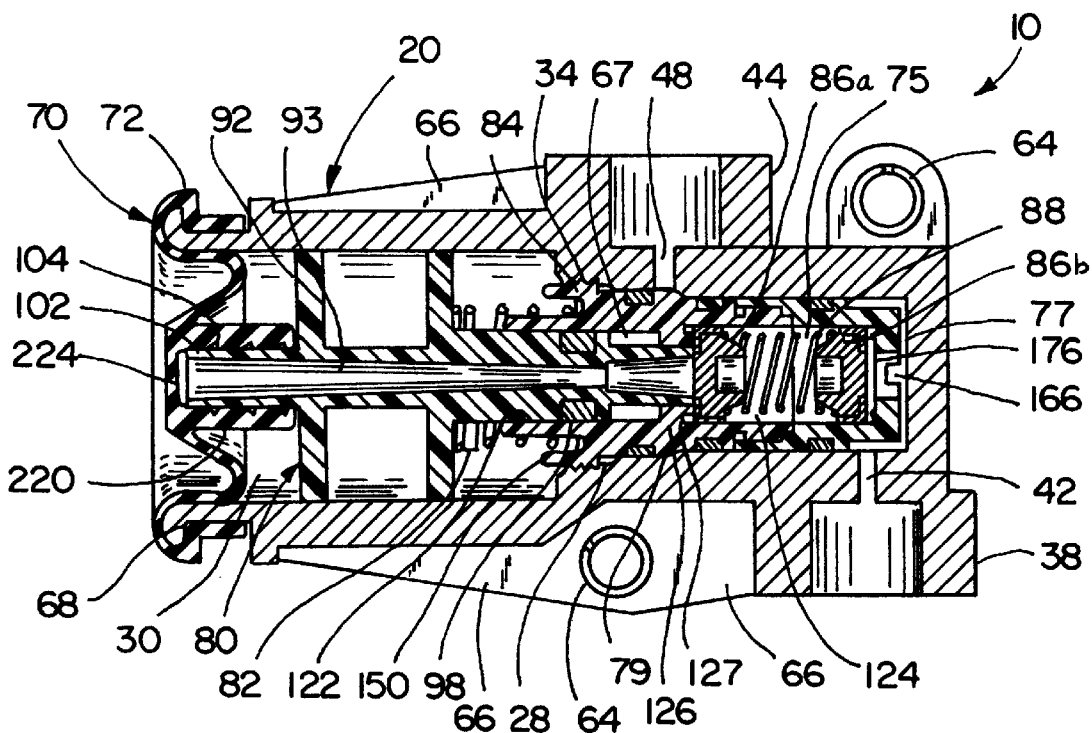
FIG. 3 is a sectional view of the height control valve in the closed position with the air fittings removed taken along line III—III of FIG. 1.
Figure 17:
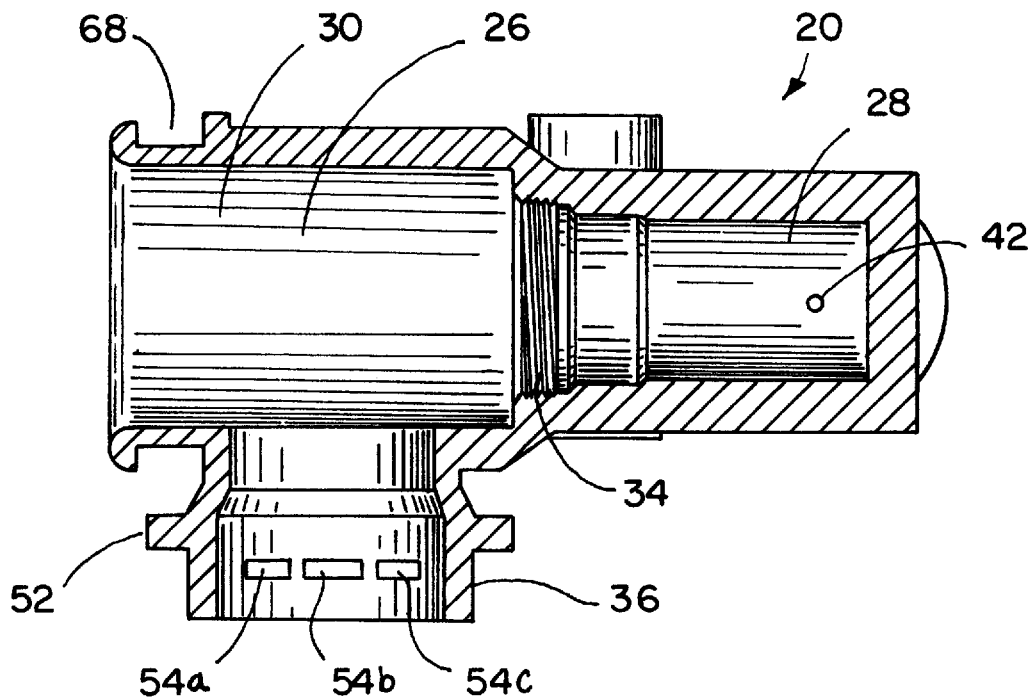
FIG. 17 is a sectional view of the valve body taken along line XVII—XVII of FIG. 2.
Figure 18:
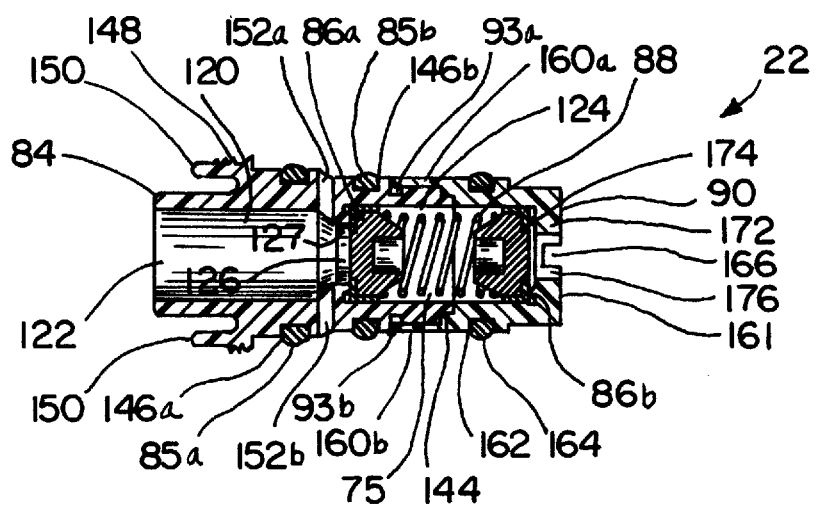
FIG. 18 is a sectional view of the valve assembly cartridge.

As perhaps best illustrated in FIGS. 2, 3 and 17, the valve body 20 defines a cylindrical bore 26 adapted to receive the plunger assembly 23 and the valve assembly cartridge 22. The bore 26 extends partially through the valve body 20, and includes a full diameter portion 30 which receives the cartridge plunger 80 and a reduced diameter portion 28 which closely receives the cartridge body 84. An annular recess 68 is defined around the valve body 20 inwardly from the open end of the bore 26. The recess 68 receives the skirt 72 of the cap diaphragm 70 as described below. The reduced diameter portion 28 defines internal threads 34 which threadedly receive the cartridge 22. The valve body 20 includes a supply port or cylindrical neck 38 which seats conventional inlet fitting 40 (See FIG. 1) and defines inlet passage 42 (See FIG. 3). Inlet passage 42 provides communication between inlet fitting 40 and reduced diameter portion 28. Similarly, the valve body 20 includes a suspension port or cylindrical neck 44 which seats conventional fitting 46 (See FIG. 1) and defines passage 48 (See FIG. 3). Inlet passage 48 provides communication between fitting 46 and reduced diameter portion 28.

The valve body 20 further includes a cylindrical throat 36 which seats the drive bearing 50. The throat 36 includes an outwardly extending annual flange 52 spaced inwardly from its outer edge. The flange 52 holds the drive bearing seal 58 in position on the throat 36 as described below. The throat 36 also defines locking key slots 54a–c (See FIG. 2). The locking key slots 54a–c receive the locking key 56 to intersecure the drive bearing 50 and valve body 20. Additionally, the valve body 20 includes a pair of mounting sleeves 60 and 62. If desired, a conventional metal insert 64 can be fitted within each of the mounting sleeves 60 and 62. The valve body 20 may also include ribs 66 which improve the structural integrity of the valve body 20.

Manipulation of the plunger assembly 23 with respect to the valve assembly cartridge 22 causes the valve 10 to move between the supply, exhaust, and closed positions. As noted above, the plunger assembly 23 is fitted within the valve body 20 in full diameter portion 30 and the valve assembly cartridge 22 is fitted within the valve body 20 in reduced diameter portion 28. As perhaps best illustrated in FIG. 2, the plunger assembly 23 includes plunger 80 and plunger spring 82, and the valve assembly cartridge 22 includes cartridge body 84, conventional seal buttons 86a–b, seal button spring 88, and cap 90. The plunger 80 is slidably interfitted with the cartridge body 84, and moves linearly to control the flow of air through the valve assembly cartridge 22 and consequently the valve 10. The plunger 80 is an elongated member having a cylindrical stem 92 and a track portion 94. The inner end 100 of the stem 92 is slidably fitted into the cartridge body 84 (See FIG. 3). An annular recess 96 extends around the inner end 100 of the stem 92 to seat o-ring 98. The outer end 102 of the stem 92 forms an exhaust port and is interfitted with the cap diaphragm 70. The outer end 102 includes barbs 104 which help to intersecure the diaphragm 70 and stem 92. The stem 92 defines an internal longitudinal passageway 93 which permits air to flow therethrough. The track portion 94 includes web member 106 extending between disc members 108a and 108b. These elements cooperate to define a track 110 which slidably receives the slide member 112. The structure and function of the slide member 112 is described below. The plunger spring 82 is interposed between the plunger 80 and cartridge body 84 to bias the plunger 80 away from the cartridge body 84 (See FIG. 3).

The cartridge body 84 and cartridge cap 90 cooperatively contain seal buttons 86a–b and seal button spring 88.

Referring now to FIGS. 2, 4, 6 and 18, the cartridge body 84 is generally cylindrical and includes inner end 140 and outer end 142. The cartridge body 84 defines an annular notch 144 adjacent to inner end 140. The annular notch 144 receives a corresponding shoulder formed in the cartridge cap 90. The cartridge body 84 also includes an annular recess 145 which receives tines 160a–b of the cartridge cap 90 and a pair of annular recesses 146a and 146b which seat o-rings 85a and 85b, respectively. A plurality of threads 148 are formed around the cartridge body 84 to mesh with the threads 34 on the interior of the valve body 20. The cartridge body 84 also includes a plurality of teeth 150 which permit the cartridge body 84 to be installed within the valve body 20 by a generally conventional insertion tool (not shown).

Figure 16:
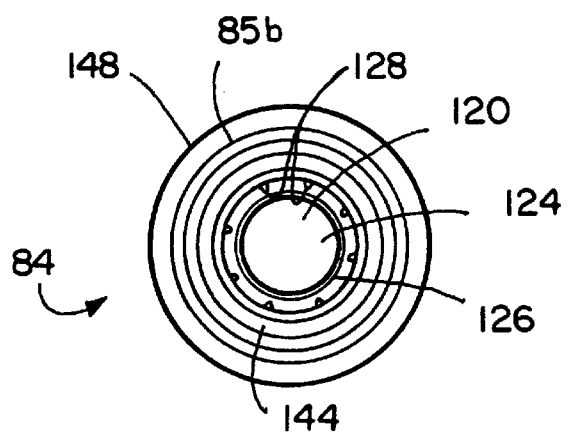
FIG. 16 is a rear elevational view of the cartridge body.

The cartridge body 84 further defines an internal bore 120 that is divided into plunger portion 122 and seal portion 124 by an internal flange 126. The surface of the flange 126 facing the plunger portion 122 is angled while the surface of the flange 126 facing the seal portion 124 includes a concentric, circular ridge 127 which forms a seat for seal button 86a. The plunger portion 122 closely receives the inner end 100 of the plunger 80. The seal portion 124 receives seal button 86a and includes internal longitudinal ribs 128 (See FIG. 16) which center the seal button 86a and permit air to flow around the periphery of the seal button 86a. The cartridge body 84 also define a pair of radial passages 152a and 152b which permit air to flow into and out of the internal bore 120.

Figure 5:
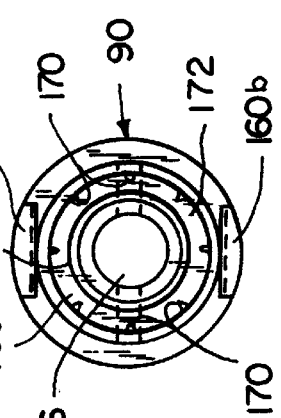
FIG. 5 is a front elevational view of the cartridge cap.

The cartridge cap 90 is generally cylindrical and includes tines 160a and 160b extending from inner end 91. The tines 160a–b include barbs 93a–b to catch in cartridge body recess 145 thereby interlocking the cartridge cap 90 and body 84 (See FIG. 18). The outer end 161 of the cap 90 includes a reduced diameter portion 163 and an end wall 172 which defines an axial flow channel 166 and a concentric flow opening 176. In addition, the cap 90 defines an annular recess 162 which seats o-ring 164 and an internal bore 168 which receives seal button 86b. The internal bore 168 includes internal longitudinal ribs 170 (See FIG. 5) which center the seal button 86b and permit air to flow around its periphery. A concentric, circular ridge 174 extends from the end wall 172 into bore 168 to engages the face of seal button 86b. The channel 166 and the opening 176 cooperate to permit air to flow through the end wall 172 into the bore 168.

Figure 9:
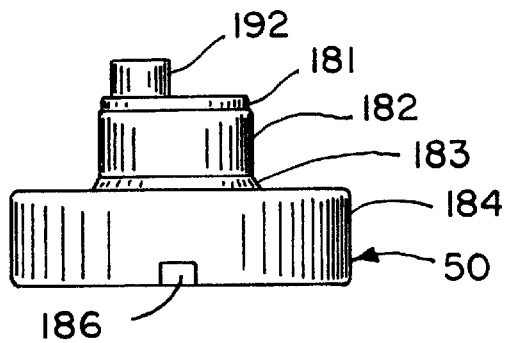
FIG. 9 is a side elevational view of the drive bearing.
Figure 13:
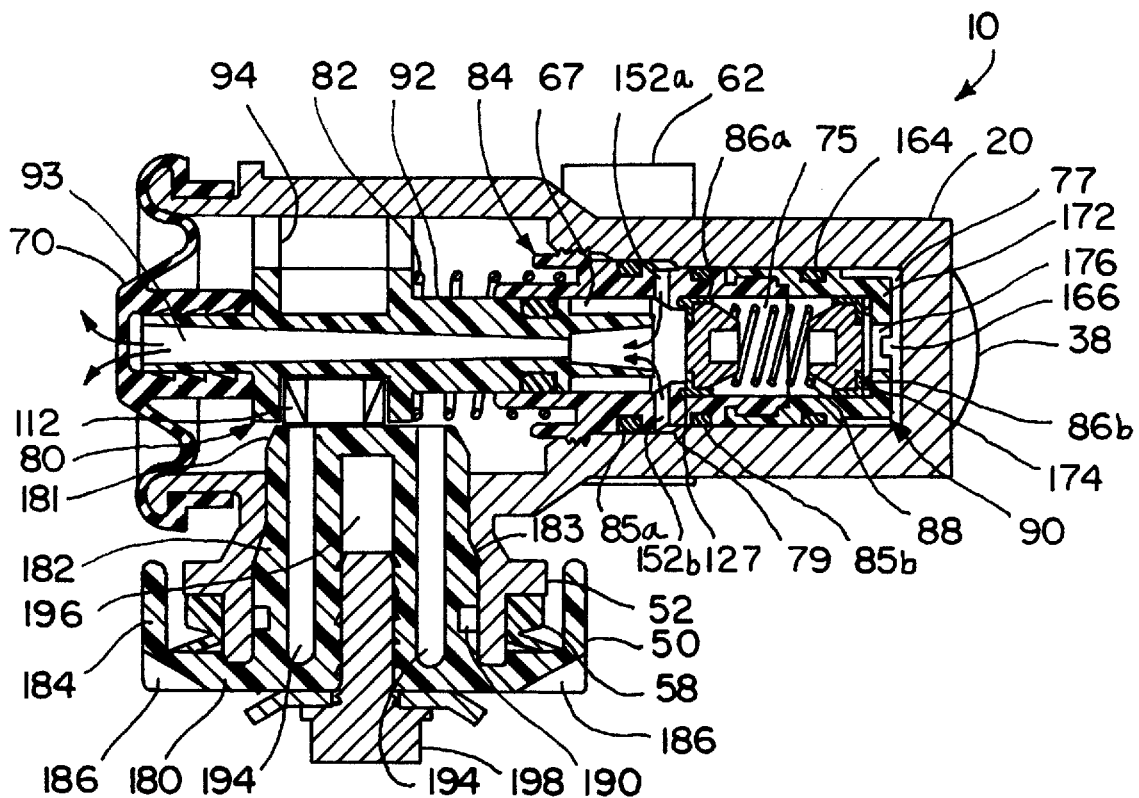
FIG. 13 is a sectional view of the height control valve in the exhaust position.

As briefly discussed above, the drive bearing 50 functions as an interface between the control arm 24 and the plunger assembly 23. Referring now to FIGS. 9 and 13, the drive bearing 50 generally includes an end wall 180, a stem portion 182 extending concentrically from the end wall 180, and a collar 184 extending from the periphery of the end wall 180. The end wall 180 defines a plurality of radially spaced notches 186, any pair of which can receive the control arm tabs 188 to prevent the control arm 24 from pivoting with respect to the drive bearing 50. The stem 182 is closely fitted within the throat 36 for rotational movement with respect to the valve body 20. The stem 182 includes an angled outer end 181 which facilitates insertion of the drive bearing 50 into the valve body 20 and an angled step portion 183 which, as described below, engages and forces the locking key 56 outwardly during assembly. An annular recess 190 extends around the stem near end wall 180 to receive locking key 56 once the drive bearing is fully inserted into the valve body 20. The stem 182 also includes an eccentric finger 192 which cooperates with slide member 112 and track 110 to translate rotational movement of the drive bearing 50 into linear movement of the plunger 80. A plurality of longitudinal voids 194 can be formed in the stem 182 to reduce the amount of material needed to manufacture the drive bearing 50. The drive bearing 50 also defines a screw hole 196 which receives screw 198 for securing the control arm 24 to the drive bearing 50.

Figure 10:
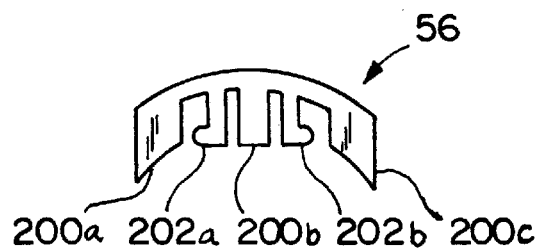
FIG. 10 is a side elevational view of the locking key.

Referring now to FIG. 10, the locking key 56 is generally arcuate and includes a plurality of legs 200a–c as well as locking flanges 202a–b. The key 56 is installed in throat 36 with legs 200a, 200b, and 200c extending through slots 54a, 54b, and 54c, respectively. In addition, locking flanges 202a–b are fitted within slot 54b to catch on the inside of throat 36 to help secure the key 56 in place during assembly. The locking flanges 202a–b are rounded to permit the key 56 to pass into and out of the slots 54a–c as needed during assembly. When the key 56 is installed, the legs 200a–c and locking flanges 202a–b extend into the stem recess 190 to interlock the drive bearing 50 and valve body 20. The drive bearing seal 58 is a generally conventional rubber seal. The seal 58 is fitted around the throat 36 over the locking key 56 to resiliently secure the locking key 56 in place and seal the joint between the drive bearing 50 and the throat 36. The collar 184 and valve body flange 52 enshroud the seal 58 to prevent its removal. The slide member 112 is manufactured from a resilient material so that a snug fit is maintained over the drive bearing finger 192 even in the event that wear occurs.

Figure 12:
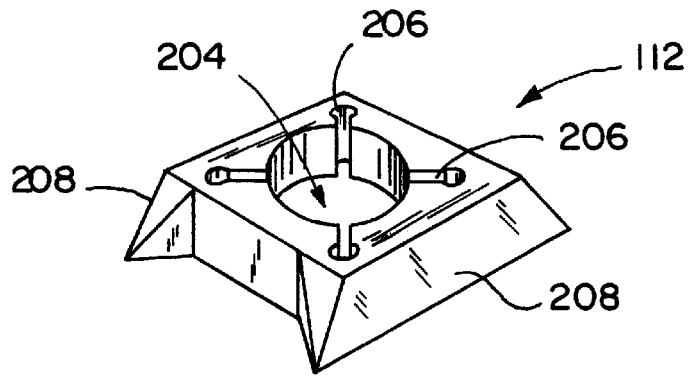
FIG. 12 is a perspective view of the slide member.

As perhaps best illustrated in FIG. 12, the slide member 112 is generally rectangular and includes a pair of runners 208 which engage and ride along the plunger track 110. The slide member 112 defines a central opening 204 which is fitted snugly over drive bearing finger 192. A plurality of slots 206 can be formed in the slide member 112 to facilitate assembly on finger 192.

The cap diaphragm 70 seals the open end of bore 26 and is secured directly to the plunger 80 and the valve body 20. The diaphragm 70 includes a collar portion 220 that is frictionally fitted over the outer end 102 of the plunger 80. The barbs 104 help to intersecure the diaphragm 70 and the plunger 80. The skirt 72 extends outwardly from the collar portion and wraps around the valve body 20 terminating in annular recess 68. The diaphragm defines a cross-shaped slit 224 which permits air flowing through the stem 92 of the plunger 80 to vent through the diaphragm 70. The cap diaphragm 70 is manufactured from a resilient material, such as rubber, so that it can flex and move when the plunger 80 moves within the valve body 20.

As noted above, the control arm 24 communicates to the valve 10 relative movement of the frame and the axle or other moving element. The control arm 24 is preferably a stamped metal structure having side walls 232a–b which strengthen the arm against longitudinal bending. The arm 24 defines mounting holes 230a and 230b near opposite ends. In addition, the arm 24 includes locking tabs 188 located on opposite sides of hole 230a. The control arm 24 is secured to the drive bearing 50 by screw 198 extending through hole 230a.

Manufacture and Assembly

The valve body 20, plunger 80, cartridge body 84, cartridge cap 90, drive bearing 50, locking key 56, cap diaphragm 70, seal buttons 86a and 86b, and slide member 112 are preferably manufactured using conventional injection molding techniques and apparatus. The slit 224 is preferably formed in the cap diaphragm 70 during molding. The cap diaphragm 70 is preferably inspected after molding to ensure that the slit 224 is properly defined. The control arm 24 is preferably stamped from steel or other suitable materials.

The springs 82 and 88; seal 58; o-rings 85*a–b,* 98, 164; air fittings 40 and 46; inserts 64; and screw 198 are generally conventional and are available from a variety of well-known suppliers.

After the valve body 20 is molded, the inserts 64 and fittings 40, 46 are installed using conventional techniques and apparatus. Likewise, the o-rings 85*a–b,* 98, and 164 are installed on the corresponding elements of the valve cartridge assembly 22. The cartridge cap 90 is then installed on the cartridge body 84 enclosing seal buttons 86*a–b* and seal button spring 88*c.* This completes assembly of the valve assembly cartridge 22.

The assembled cartridge 22 is installed within the valve body 20 by a conventional tool (not shown) having openings which interfit with the teeth 150 of the cartridge body 84. The cartridge is inserted into bore 26 until threads 148 contact thread 34. Then the cartridge 22 is threaded into the valve body 20 until it reaches the desired position. The desired position is determined by a conventional feeler assembly (not shown) which measures the distance that the cartridge body is inserted within the valve body 20. Correct positioning of the cartridge 22 is necessary for proper operation of the valve. A commercially available thread-lock can be applied to the threads 34 and/or 148 to secure the cartridge 22 in place.

Once the cartridge 22 is installed, the o-rings 85*a,* 85*b,* and 164 seal against the wall of reduced diameter portion 28. O-ring 164 defines air chamber 77 which is in communication with inlet passage 42 and chamber 75 via channel 166 and opening 176. O-rings 85*a* and 85*b* cooperate to define air chamber 79 around cartridge body 84 in communication with valve body passage 48 and chamber 67 via passages 152*a–b.*

After the cartridge 22 is installed, the plunger spring 82 is fitted over the plunger stem 92 and the inner end 100 of the stem 92 is slidably fitted into the cartridge body 84. O-ring 98 provides a seal between the stem 92 and the internal wall of bore 120 to define air chamber 67.

Next, the drive bearing 50 is attached to the valve body 20. First, the locking key 56 is installed in the throat 36 of the valve body 20 within slots 54*a–c.* The rubber seal 58 is then fitted over the throat 36 on top of the locking key 56. In addition, the slide member 112 is either inserted within the plunger track 110 to receive the eccentric finger 192 when the drive bearing 50 is inserted into the throat 36 or frictionally fitted over the eccentric finger 192 prior to insertion of the drive bearing 50. The drive bearing 50 is then positioned so that the stem 182 is aligned with the throat 36, and the finger 192 is at the bottom of the stem 182. Once aligned, the drive bearing 50 is inserted into throat 36. As the stem 182 moves into the throat 36, the angled step portion 183 engages the locking key 56 forcing it outwardly through slots 54*a–c.* The resilient rubber seal 58 flexes to allow this outward movement. Once the stem 182 is fully inserted into the throat 36, the locking key 56 comes into alignment with the annular recess 190. Once aligned, the resilient rubber seal 58 forces the locking key 56 back into position with the legs 200*a–c* and flanges 202*a–b* extending into recess 190 to interlock the drive bearing 50 and the valve body 20. The flange 52 and collar 184 enshroud the seal 58 to prevent its removal.

The cap diaphragm 70 is then installed by frictionally fitting the diaphragm collar 220 over the outer end 102 of the plunger stem 92. The barbs 104 make it more difficult to remove the collar 220 from the stem 92. The skirt 72 is then wrapped around the valve body 20 terminating in recess 68.

The control arm 24 is installed on the drive bearing 50 by screw 198. The control arm 24 is aligned with the drive bearing 50 by fitting tabs 188 into the desired pair of slots 186.

The assembled height control valve 10 is installed on a vehicle, such as a semi-trailer (not shown), by securing the valve body 20 to the frame and the control arm to the axle (or other moving element) using conventional brackets. As noted above, the control valve can be installed in reverse if desired. The supply of compressed air 14 is connected via a conventional supply line 16 to valve fitting 40 and the air spring 16 is connected via a conventional supply line 18 to valve fitting 46.

In the preferred embodiment, the leveling system 12 includes a separate height control valve for each air spring to permit compensation for fore-aft tilting and side-to-side tilting. Alternatively, the system can include a separate height control valve for each axle to permit compensation for fore-aft tilting, or a single height control valve for all air springs to permit only vertical adjustment of the frame.

Operation

In operation, the height control valve 10 moves between three positions (i.e. closed, supply, and exhaust) depending on the linear position of the plunger 80 within the valve body 20. The closed position is illustrated in FIGS. 3 and 15. In this position, the valve 10 prevents air from entering or exiting the air spring 16. The valve 10 is in the closed position when the control arm 24 is centrally located with respect to the valve body 20. When the control arm 24 is centrally located, the eccentric finger 192 is located at the bottom center of the stem 182. This position of the finger 192 centers the plunger track 110 on the axis of the drive bearing 50. Rotation of the control arm 24 from this position will result in rotation of the drive bearing 50 and eccentric finger 192. Rotational movement of the finger 192 about the axis of the drive bearing 50 results in linear movement of the plunger 80 as described below.

The valve 10 is connected to the supply 14 at fitting 40 via supply line 15. Air from the supply 14 flows from the fitting 40 into chamber 77 through inlet passage 42. Initially, the difference in air pressure between chambers 77 and 75 forces the seal button 86*b* to unseat from ridge 174, thereby permitting air to flow from chamber 77 into chamber 75. Once the air pressure has equalized, the seal button spring 88 returns the seal button 86*b* to its seated position against ridge 174. The air pressure in chamber 75 also urges seal button 86*a* into ridge 127 to seal chamber 75 against air flow between chamber 75 and chamber 67. Consequently, when in the closed position, the seal button 86*b* seals chamber 77 to prevent the movement of air from chamber 77 into chamber 75.

The valve 10 is also connected to the air spring 16 via fitting 46. Valve body passage 48 provides communication between the fitting 46 and chamber 79. Also, cartridge body passages 152*a* and 152*b* provide communication between chamber 79 and chamber 67. When the valve 10 is in the closed position, the inner end 100 of the stem 92 is seated against the face of seal button 86*a.* This seals off stem passage 93 to prevent air from exiting the chamber 67 through the stem 92. Consequently, when in the closed position, air is not able to exhaust from the air springs 16 through the valve 10.

Figure 14:
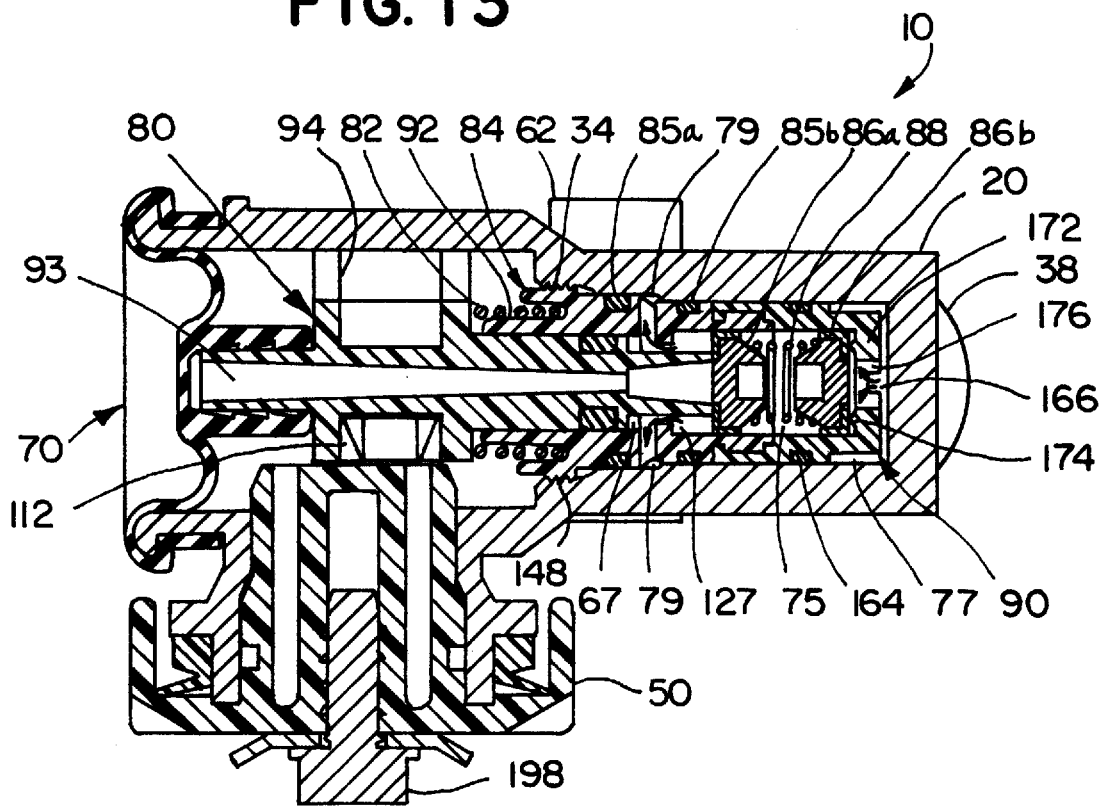
FIG. 14 is a sectional view of the height control valve in the supply position.

The supply position is illustrated in FIG. 14. When the valve 10 is in the supply position, a flow path is opened between inlet passage 42 and suspension passage 48 to permit air to flow from the supply 14 to the air spring 16. The valve 10 moves into this position when the axle moves closer to the frame causing the control arm 24 to pivot upwardly and the drive bearing 50 to rotate in a counter-clockwise direction. This rotation of the drive bearing 50 causes the eccentric finger 192 to move in a path having both horizontal and vertical components. The vertical component of the finger's 192 movement is translated into vertical movement of the slide member 112 along the plunger track 110 while the horizontal component of the finger's movement is translated into horizontal movement of the plunger 80 toward the cartridge body. This causes the inner end 100 of plunger stem 92 to push seal button 86*a* away from flange 126, thereby unseating the seal button 86*a* and permitting air to flow from chamber 75 into chamber 67. From chamber 67, the air flows through passages 152*a–b* into chamber 79, and eventually into the air spring 16 through passage 48, fitting 46, and supply line 18. As the air spring 16 fills, the axle and frame move farther apart causing the control arm 24 to pivot eventually returning the valve 10 to the closed position.

The exhaust position is position in FIG. 13. When the valve 10 is in the exhaust position, a flow path is opened between passage 48 and plunger passage 93 to permit air to exhaust from the air spring 16. The valve 10 moves into the exhaust position when the axle moves away from the frame causing the control arm 24 to pivot downwardly and the drive bearing 50 to rotate in a clockwise direction. This rotation of the drive bearing 50 causes the eccentric finger 192 to move in a path having both horizontal and vertical components. The vertical component of the finger's 192 movement is translated into vertical movement of the slide member 112 along the plunger track 110 while the horizontal component of the finger's movement is translated into horizontal movement of the plunger 80 away from the cartridge body 84. This causes the inner end 100 of plunger stem 92 to move away from seal button 86*a*, thereby opening a flow path from the air spring 16 to the atmosphere. Specifically, this permits air to flow from the air spring 16 sequentially through supply line 18, fitting 46, passage 48, chamber 79, passages 152*a–b*, chamber 67, plunger passage 93, and diaphragm slit 224. As the air spring 16 empties, the axle and frame move closer together causing the control arm 24 to pivot upwardly eventually returning the valve 10 to the closed position.

Operation of the height control valve 10 has been described in connection with the preferred embodiment described above. The manner of operation can be altered by varying the manner in which the valve 10 is installed or its components are assembled. For example, the drive bearing 50 can be oriented so that the eccentric finger 192 is located at the top center of the plunger track 110 when the control the control arm 24 is centrally located. This will reverse operation of the height control valve 10. Similarly, operation of the valve 10 can be varied by altering the orientation of the control arm 24 with respect to the drive bearing 50 or by reversing installation of the valve 10 such that the valve body 20 is secured to the axle (or other related element) and the control arm 24 is secured to the frame (or other related element).

Alternative Embodiment

Figure 19:
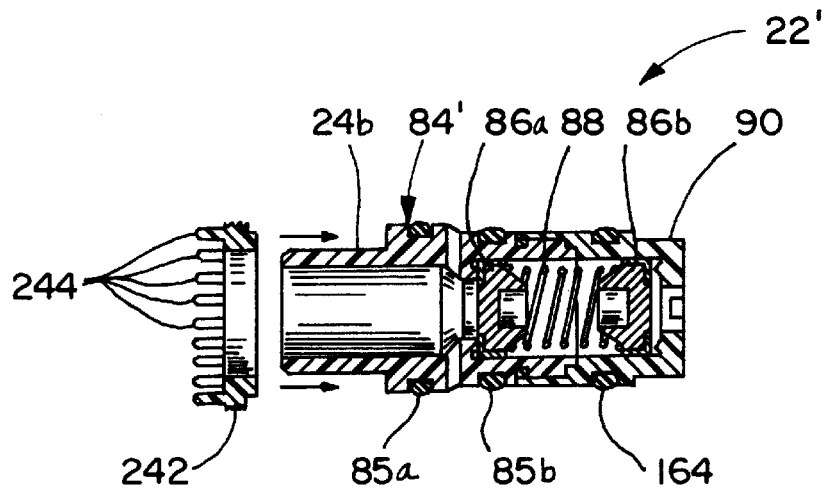
FIG. 19 is a partially exploded sectional view of an alternative valve assembly cartridge.

An alternative valve assembly cartridge 22' is illustrated in FIG. 19. In this embodiment, the threads 148 and teeth 150 are removed and a separate, threaded cartridge ring 240 is added to the valve assembly cartridge 22'. The cartridge ring 240 functions to secure the valve assembly cartridge 22' within the reduced diameter portion 28 of the valve body 20. The internal diameter of the cartridge ring 240 corresponds with the external diameter of the cartridge body 84' at the location 246 where the threads 148 and teeth 150 were removed. The cartridge ring 240 includes external threads 242 which mesh with the internal threads 34 on the interior of the valve body 20. The cartridge ring 240 also includes a plurality of teeth 244 which permit the ring 240 to be installed within the valve body 20 by a generally conventional insertion tool (not shown). As in the preferred embodiment, this permits the valve assembly cartridge 22' to be installed at the desired position by a conventional feeler assembly (not shown).

In this embodiment, the height control valve is assembled as described in connection with the preferred embodiment except that the alternative valve assembly cartridge 22' is installed within the valve body 20 in a slightly different manner. First, the o-rings 85*a–b* and 164 are installed on the valve assembly cartridge 22'. Then, the cartridge cap 90 is installed on the cartridge body 84' enclosing seal buttons 86*a–b* and seal button spring 88. This assembly is then inserted in the reduced diameter portion 28 of the valve body 20.

The cartridge ring 240 is then installed within the valve body 20 by a conventional tool (not shown) having openings which interfit with the teeth 244 of the cartridge ring 240. The cartridge ring 240 is inserted into bore 26 over the cartridge body 84' until threads 242 contact thread 34. Then, the cartridge ring 240 is threaded into the valve body 20 until it reaches the desired position. The desired position is determined by a conventional feeler assembly (not shown) which measures the distance that the cartridge ring 240 is inserted within the valve body 20. Correct positioning of the cartridge ring 240 is necessary for proper operation of the valve. A commercially available thread-lock can be applied to the threads 34 and/or 242 to secure the cartridge ring 240 in place. The cartridge ring 240 thereby secures the valve assembly cartridge 22' in place within the reduced diameter portion 28 of the valve body 20. Air pressure behind the cartridge body 84' urges the cartridge body 84' into firm engagement with the cartridge ring 240.

The above description is that of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A height control valve for a leveling system comprising:

a valve body defining a cylindrical bore, a supply port, an exhaust port, and a suspension port;

a valve assembly cartridge fitted entirely within said bore, said valve assembly cartridge including a seal arrangement;

a means for closing said cylindrical bore, said means for closing enclosing said valve assembly cartridge within said cylindrical bore to prevent ready access to said valve assembly cartridge;

a plunger being movable with respect to said seal arrangement to selectively move said seal arrangement between a supply position in which air entering said supply port is directed to said suspension port, an exhaust position in which air entering said suspension port is directed to said exhaust port, and a closed position in which said suspension port is closed to prevent air from flowing therethrough; and means for securing said cartridge within said bore.

2. The valve of claim 1 wherein said means for securing includes mating cartridge threads and valve body threads.

3. The valve of claim 2 wherein said cartridge includes a cartridge body and a cartridge cap which are intersecured and cooperatively contain said seal arrangement.

4. The valve of claim 3 wherein said seal arrangement includes a seal button and seal button spring which biases the seal button.

5. The valve of claim 3 wherein said seal arrangement includes a seal button spring disposed between a pair of seal buttons.

6. The valve of claim 5 further comprising a control arm operatively connected to said plunger, whereby movement of said control arm causes said plunger to move with respect to said seal arrangement thereby moving said seal button between said supply, exhaust, and closed positions.

7. The valve of claim 6 further comprising a drive bearing interposed between said control arm and said plunger.

8. The valve of claim 7 further comprising means for interlocking said drive bearing with said valve body.

9. The valve of claim 8 wherein said means for interlocking includes a locking key having legs which interlock said drive bearing and said valve body.

10. The valve of claim 9 wherein said drive bearing includes an annular recess, said legs of said locking key extending into said annular recess.

11. The valve of claim 10 wherein said means for closing includes a resilient diaphragm extending between said plunger and said valve body, said diaphragm defining an opening to permit air to exhaust from the valve.

12. The valve of claim 11 wherein said diaphragm includes a collar fitted over said plunger.

13. The valve of claim 1 wherein said cartridge includes a cartridge ring, said means for securing including mating cartridge ring threads and valve body threads.

14. A height control valve comprising:

a valve body defining a bore;

a valve assembly cartridge fitted entirely within said bore, said cartridge including a seal arrangement;

a means for closing said bore wherein said valve assembly cartridge is fully enclosed to prevent ready access to said valve assembly cartridge;

a plunger movable with respect to said seal arrangement; and thread means for securing said cartridge within said bore, said thread means permitting adjustment of the position of said cartridge within said bore.

15. The valve of claim 14 wherein said thread means includes mating cartridge threads and valve body threads.

16. The valve of claim 15 wherein said cartridge includes a cartridge ring, said thread means including mating cartridge ring threads and valve body threads.

17. A height control valve comprising:

a valve body defining a bore;

a valve assembly fitted within said bore;

a movable element adapted to travel within said bore, said movable element defining an exhaust port;

an actuator mechanism for controlling movement of said movable element; and a diaphragm extending between said movable element and said valve body to seal said bore, said diaphragm being resilient to permit said movable element to travel within said bore without rupturing said seal, said diaphragm including a vent opening communicating with said exhaust port to permit air to vent from said valve, said diaphragm disposed externally from said valve assembly and said actuator mechanism to prevent said valve assembly and said actuator mechanism from exposure to venting air.

18. The height control valve of claim 17 wherein said diaphragm includes a collar fitted over said movable element and a skirt fitted over said valve body.

19. The height control valve of claim 18 wherein said movable element comprises a plunger defining an exhaust port, said diaphragm collar being fitted over said plunger at said exhaust port.

20. The height control valve of claim 19 wherein said plunger includes barbs adjacent said exhaust port, said collar being fitted over said barbs.

21. The height control valve of claim 20 further comprising:

a drive bearing operatively connected to said plunger; and a means for interlocking said drive bearing with said valve body.

22. The height control valve of claim 21 wherein said means for interlocking includes a locking key having legs which interlock said drive bearing and said valve body.

23. The height control valve of claim 22 wherein said drive bearing includes an annular recess, said legs of said locking key extending through said valve body into said annular recess.

24. A height control valve comprising:

a valve body defining a bore;

a seal arrangement contained within said bore;

a movable element adapted to move within said bore, said movable element defining an exhaust port;

an actuator mechanism for controlling movement of said movable element; and a diaphragm extending between said movable element and said valve body to seal said bore, said diaphragm being flexible and resilient to permit said movable element to travel without rupturing said seal, said diaphragm including a vent opening communicating with said exhaust port to permit air to vent from said valve, said diaphragm disposed externally from said valve assembly and said actuator mechanism to prevent said valve assembly and said actuator mechanism from exposure to venting air.

25. The valve of claim 24 wherein said diaphragm includes a collar fitted over said movable element and a skirt fitted over said valve body.

26. A height control valve comprising:

a valve body defining a bore;

a plunger movably seated within said bore;

a drive bearing operatively connected to said plunger such that movement of said drive bearing results in movement of said plunger within said bore;

a means for interlocking said drive bearing with said valve body; and a tamper-resistant means for preventing ready access to said means for interlocking.

27. The valve of claim 26 wherein said means for interlocking includes a locking key having a leg which interlocks said drive bearing and said valve body.

28. The valve of claim 27 wherein said drive bearing includes an annular recess, said leg of said locking key extending into said annular recess.

29. The valve of claim 28 wherein said valve body includes a slot receiving said locking key.

30. The valve of claim 29 further comprising a means for resiliently securing the locking key within said slot.

31. A height control valve comprising:

a valve body defining a bore;

a plunger movably seated within said bore:

a drive bearing operatively connected to said plunger such that movement of said drive bearing results in movement of said plunger within said bore, said drive bearing including an annular recess and a slot; and a means for interlocking said drive bearing with said valve body, said means for interlocking including a locking key having a leg which interlocks said drive bearing and said valve body, said slot receiving said locking key with said leg extending into said annular recess;

means for resiliently securing the locking key within said slot, said means for resiliently securing the locking key within said slot comprising a rubber seal fitted around said valve body at said slot.

32. The valve of claim 31 wherein said valve body includes throat and said drive bearing includes a stem fitted within said throat, said annular recess being defined by said stem and said slot being defined by said throat.

33. The valve of claim 32 wherein said drive bearing includes a collar surrounding said rubber seal.

34. The valve of claim 33 wherein said throat includes an annular flange cooperating with said collar to prevent access to said rubber seal.

35. The valve of claim 34 wherein said stem includes an angled step portion to force said locking key outwardly during assembly of said valve.

36. A height control valve comprising:

a valve body defining a bore;

a seal arrangement housed within said bore;

a plunger movably seated within said bore;

a drive means for causing movement of said plunger within said bore;

means for locking said drive means to said valve body to deter unauthorized access to said seal arrangement; and tamper-resistant means for preventing ready access to said means for locking.

37. The valve of claim 36 wherein said means for locking includes a locking key having a leg which interlocks said drive bearing and said valve body, said means for locking also including a resilient means for securing said locking key in place, said tamper-resistant means including a collar closely surrounding said resilient means to prevent its ready removal.

* * * * *